United States Patent
Muris-Trevino

(10) Patent No.: US 6,902,611 B2
(45) Date of Patent: Jun. 7, 2005

(54) HEAT DISSIPATING COATING AND METHOD FOR DECREASING THE INNER TEMPERATURE OF BUILDINGS AND SIMILAR CONSTRUCTIONS

(75) Inventor: Alfonso R. Muris-Trevino, Nuevo Leon (MX)

(73) Assignee: Constructora y Servicios Industriales de Monterrey S.A. de C. V., Nuevo Leon (MX)

( * ) Notice: Subject to any disclaimer, the term of this patent is extended or adjusted under 35 U.S.C. 154(b) by 0 days.

(21) Appl. No.: 10/626,401

(22) Filed: Jul. 24, 2003

(65) Prior Publication Data

US 2004/0131785 A1 Jul. 8, 2004

(30) Foreign Application Priority Data

Sep. 4, 2002 (MX) .............................. PA/A/2002/008648

(51) Int. Cl.$^7$ ............................ C09D 1/00; C09D 5/00; C09D 5/33
(52) U.S. Cl. .................. 106/287.17; 428/450; 428/454; 52/515
(58) Field of Search ..................... 106/287.17; 428/450, 428/454; 52/515

(56) References Cited

U.S. PATENT DOCUMENTS

| | | | |
|---|---|---|---|
| 3,620,791 A | 11/1971 | Krupnick | 106/288 B |
| 4,442,242 A | 4/1984 | Fogelberg | 523/200 |
| 4,623,390 A | 11/1986 | Delmonico | 106/15.05 |
| 4,664,182 A | 5/1987 | Miwa | 165/133 |
| 4,761,965 A | 8/1988 | Viner | 62/171 |
| 4,859,723 A | 8/1989 | Kyminas et al. | 524/31 |
| 5,049,353 A | 9/1991 | Conway et al. | 376/293 |
| 5,154,768 A | 10/1992 | Yamada et al. | 106/450 |
| 5,520,009 A | 5/1996 | Jespsen et al. | 62/272 |
| 6,036,765 A * | 3/2000 | Farrow et al. | 106/487 |
| 6,048,910 A | 4/2000 | Furuya et al. | 522/86 |
| 6,197,101 B1 | 3/2001 | Matsumura et al. | 106/287.11 |
| 6,250,091 B1 | 6/2001 | Jerome | 62/171 |
| 6,271,293 B1 | 8/2001 | Karuga et al. | 524/265 |
| 2002/0010295 A1 | 1/2002 | Nishida | |
| 2002/0045702 A1 | 4/2002 | Nakamura et al. | |

FOREIGN PATENT DOCUMENTS

| | | |
|---|---|---|
| DE | 40 27 044 A1 | 3/1992 |
| IT | 1252390 | 6/1995 |

* cited by examiner

*Primary Examiner*—David Brunsman
(74) *Attorney, Agent, or Firm*—Frommer Lawrence & Haug LLP; A. Thomas S. Safford

(57) ABSTRACT

A heat-dissipating aqueous coating composition and a method for making more comfortable the inner temperature of buildings, housings and the like, by applying a thin layer of said aqueous composition on the exterior surfaces of roofs and walls, which composition dissipates heat from said roofs and walls through evaporation of water which is absorbed from ambient air by a hygroscopic material contained in said composition. The absorption-evaporation cycle is repeated through the daily natural changes of relative humidity of ambient air following the heating and cooling cycles of said roofs and walls exposed to solar radiation. The aqueous composition contributes to savings in energy consumption of air conditioning equipment and may be applied with excellent adherence and durability over exterior surfaces of concrete, metallic sheet and other materials.

10 Claims, No Drawings

HEAT DISSIPATING COATING AND METHOD FOR DECREASING THE INNER TEMPERATURE OF BUILDINGS AND SIMILAR CONSTRUCTIONS

RELATED APPLICATION

This application claims priority from Mexican patent application No. PA/a/2002/008648 filed Sep. 4, 2002.

FIELD OF THE INVENTION

The present invention relates to inexpensive a thin-layer coatings for reducing interior temperatures of coated structures.

The present invention is an improved thin-layer coating having a chemical composition comprising a hygroscopic or hydrophilic component which for example during a daily cycle allows it to absorb ambient moisture during the night and later under the direct sunlight to dissipate heat by water evaporation, while additionally providing some heat insulating effect and also reflecting a high percentage of the solar radiation. Application of the coating of the invention to walls and roofs of a building, a house or similar construction, lowers the inner temperature within said building, making it more comfortable and also saves electric energy by decreasing the amount of heat that has to be extracted by an air conditioner.

BACKGROUND OF THE INVENTION

The need exists of maintaining the inner temperature of a house, not yet fully satisfied, within a suitable and comfortable range. High temperature cycles during summer time in a number of regions make it necessary to install and operate air conditioning equipment with the consequent cost of energy therefor. In order to save energy, the walls and roofs of buildings are normally insulated with coatings of low thermal conductivity, for example polyurethane and polystyrene. These materials however imply a high application cost because they require an additional coating of other materials to prevent degradation caused by solar radiation, and also these polymers have the disadvantage of being flammable.

There are already on the market a variety of coatings which may be applied to the walls and roofs of buildings exposed to solar radiation for lowering the temperature in said buildings. In general, these coatings merely comprise a light colored pigment, since it is well known that dark-colored materials absorb more radiation heat than light-colored materials. As more radiation is reflected by the coating, less heat accumulates in the roofs and walls; and therefore the inner temperature is lower because less heat is radiated to the interior space of said buildings.

Additionally, such coatings may comprise materials of very low thermal conductivity in order to provide a heat insulating effect, for example, glass microspheres of a particle size between 50 and 150 microns, as described in U.S. Pat. No. 4,623,390.

The coating of the present invention provides, in addition to the effects of thermal insulation and of high radiation percentage reflectance, a heat dissipating effect derived from a a hygroscopic ingredient, which absorbs water from ambient air, which water later on evaporates when solar radiation increases the temperature of said coating. Thus some of the solar energy that would have gone to raise the temperature of the coated building is instead diverted into providing the latent heat of evaporation used in drying out the hygroscopic coating. In other words, the coating of the invention permits the evaporation of the absorbed humidity and therefore heat is dissipated to the environment further decreasing the temperature of the building roof and consequently also the inner temperature in said building.

British patent No. 762,272 discloses a composition of a coating utilized for solving a typical problem of water condensation in cold climate regions (where the exterior temperature is lower than the temperature of the interior of buildings, and the inner temperature is made comfortable by some heating equipment). In these regions, it is desired as much as possible to prevent heat flow from the inner space to the exterior environment. For this purpose, the roofs and walls of buildings are coated with thermal insulating materials. However, when the temperature of the inner surfaces of roofs and walls reaches the dew point of the air inside the building, water is condensed and drops from the ceiling etc. This patent proposes a solution to this problem by coating the inner surfaces with a coating comprising a hygroscopic material, diatomaceous earth (diatomite) or other inorganic hydrophilic materials, for example, pumice, basic magnesium carbonate and fuller earth. These materials are porous and absorb the condensed water thus avoiding drops from falling. The composition disclosed in this prior art patent is essentially: a film-forming agglomerating material, cellulose compounds emulsified in water, water forming the continuous phase and an inorganic material of low thermal conductivity (k<0.8) dispersed in the mixture comprising the hydrophilic cellular material in an amount of 10% to 45% by weight, which can be diatomite. The thickness of the coating in the tests described in this patent was 0.6 mm.

U.S. Pat. No. 4,442,242 discloses the composition of a coating for surface insulation with the purpose of preventing or decreasing formation of condensed water. This coating is applied to the treated surface as a film having a thickness between 0.5 and 10 mm, preferably from 1 to 5 mm. This patent describes a film-forming binding material dispersed in an aqueous vehicle having granules of heat-expanded perlite which can form an insulating and water absorbing coating. The coating contains from 5% to 20% perlite granules by weight with a particle size between 0.01 mm to 1.5 mm before its application. The coating of this patent is capable of absorbing water but is not utilized for decreasing the inner temperature of a building and is used as applied in thick layers, therefore representing a higher cost. This coating is also utilized in buildings where heat flows from the inner part of the building to the exterior environment.

Applicants have not found a prior art reference suggesting or disclosing the concept of the present invention, which comprises to coat the roofs and walls of a building, house or similar construction with a thin layer of a coating which dissipates the accumulated heat by the evaporative effect of water absorbed by a hygroscopic material contained in said coating; and where the water is absorbed from the ambient air and where the absorption-evaporation cycle is repeated by the changing dynamics of relative humidity of ambient air and the temperature increase of said coating by being exposed to solar radiation.

It is therefore an object of the present invention to provide a method and a coating for decreasing the inner temperature of a building, house or similar construction, exposed to solar radiation, by means of a heat dissipation effect.

It is another object of the present invention to provide a method and a coating for decreasing the energy consumption of air conditioning equipment by decreasing the amount of heat radiated to the interior of a building by the roofs and walls thereof.

It is a further object of the present invention to provide a method and a coating of low cost for rendering more comfortable buildings and houses in hot-climate regions, even if they do not have air conditioning equipment.

Other objects of this invention will be pointed out below in this specification or will be evident to those skilled in the art.

SUMMARY OF THE INVENTION

The objects of the present invention will be achieved by applying over the exterior surfaces of walls and roof of buildings, houses or similar constructions, including stores, silos, industrial facilities, etc. a coating of such a composition that dissipates heat from the surface exposed to solar radiation additionally to the insulating and radiation-reflecting effects.

The chemical composition of the present invention comprises:

From 23% to 43% of an inorganic inert and hygroscopic material; from 5% to 15% clay; from 1% to 3% of ammonia; from 5% to 9% styrene; from 1% and 5% of an inorganic pigment: from 2% to 6% of silicon dioxide and from 40% to 60% of water. In addition to the above-mentioned components, the coating may contain cellulose compounds, fungicides, dispersants, antifoaming agents and other chemicals commonly used in the paint and coating industry. Preferably, the inorganic hygroscopic material is diatomite. The coating of the invention has heat-insulating properties which reduces heat conduction from its surface to the roof of a building. The coating is of a whitish color with a very high reflecting index of solar radiation. Also, the hygroscopic material in the coating absorbs water from ambient air, which water is thereafter evaporated when the temperature of the coating is raised by solar radiation, thus dissipating heat that had been accumulated in the roof.

The water absorption-evaporation cycle is repeated continuously following the changes in relative humidity of ambient air and the temperature of the coating during the daily cycle of solar heating.

DETAILED DESCRIPTION OF THE INVENTION

The chemical composition of the present invention comprises as an essential element a hygroscopic or hydrophilic inorganic material of low thermal conductivity, which in a preferred embodiment is calcined diatomite (diatomaceous earth). This material is extracted from mines, frequently mixed with lime, since it is an inorganic calcareous material formed by the shells of unicellular beings which lived in lakes and oceans thousands of years ago. Due to its high porosity, this material is mostly utilized as filter media in the beverage and food industry, and also as filler in some paints. Its utilization as a hygroscopic agent after calcining however has not been previously suggested with the purpose of dissipating heat by water evaporation, with the consequent effect of making more comfortable the inner temperature of a building, house, office facilities, ducts, tanks, cold rooms, air conditioning equipment, silos, industrial facilities and similar constructions. Silica gel can also be used as a hygroscopic agent.

In warm-weather regions, a significant living cost factor in every household is electricity needed for air conditioning/cooling to decrease the interior temperature raise caused by solar heating of the roofs and walls. The herein claimed coating may be used to contribute to minimizing the energy cost for operating air conditioners; since it reduces the heat load of said equipment by evaporation of the water absorbed by the hygroscopic agent contained in said coating.

In U.S. Pat. No. 4,761,965 and U.S. Pat. No. 6,250,091, it has been proposed to dissipate heat in house roofs through water evaporation by providing a porous absorbing material and a set of water distribution pipes, for distributing and dosing liquid water over said absorbing material. This concept however has a high installation and operating costs due to the piping network and water as well as electricity costs for water pumping and control, besides the maintenance of piping and the periodic cleaning of the absorbent material, which is maintained humid and therefore develops fungi and other microorganisms.

In contrast with the above, the effect of heat dissipation in the present invention is produced without direct addition of water but relies on the natural variation cycles of relative humidity of ambient air. These normal cycles cause the hygroscopic material to absorb water from the natural high relative humidity air conditions. When the air temperature raises and the relative humidity decreases, then the absorbed water evaporates thus dissipating heat from the roof and/or walls.

It has been determined that the coating of the invention can absorb an amount of water equivalent to about 7% to 10% of its weight. As air is continuously moving and the relative humidity also continuously changes, the cycles of water absorption/evaporation occur frequently, therefore a significant effect of heat dissipation is produced.

The preferred method for applying the coating is to cover the surfaces with a first layer using a brush or a roll, dry it, which takes about 90 minutes depending on the current ambient conditions, and later on to apply a second layer so that the final combined dry layers form a film of about 4 to about 6 mils thickness (0.10 mm to 0.13 mm). Thickness of the coating when humid is between about 8 to about 10 mils (0.20 mm to 0.25 mm).

The advantages of the coating of the invention can be summarized as follows:

It resists the action of chemicals and damage caused by the environment. It avoids the thermal shock (expansion-contraction) of roofs by homogenizing the temperature and reducing heat accumulation in its surface. It insulates the roofs/walls thermally. In this respect, the coating surpasses the insulating properties of sprayed polyurethane and of other insulating elastomeric materials and glass wool. The coating is durable with elastic properties to avoid formation of cracks and ruptures. Its cost is low given its durability and does not require any maintenance. Additionally, it does not require sophisticated equipment for its application. It is not toxic or a contaminant. It does not require organic solvents, and it is not flammable. It is 100% environmentally acceptable.

The solar reflectance and thermal emittance of the coating of the invention were measured as 88.3% and 0.92 respectively.

EXAMPLE 1

A layer of coating of the invention of a thickness between 4 to 6 mils was applied on the exterior surface of the roof and walls of a concrete seed storage silo, which silo is usually refrigerated in order to keep the seeds in good conditions, implying a high cost of refrigeration. The heat accumulated in the roof and walls decreased with the consequent reduction of the inner temperature of said silo and therefore producing significant savings in energy. The coating had an excellent adherence to the surfaces of the silo and did not show any cracking or bubbles. Its white color has not changed for several months even though it is exposed to intense solar radiation. It is fully washable and does not require any maintenance.

EXAMPLE 2

A layer of coating of the invention was applied on the exterior surfaces of a galvanized steel sheet silo for grain storage. The temperature of the roof and walls decreased 20° C. in average. This cooling effect has reduced the problems of plagues, fungi and grain durability.

It is of course to be understood that in the above specification some preferred embodiments of the invention have been described, and that numerous changes can be made to said embodiments without departing from the spirit of the invention as defined in the appended claims.

What is claimed is:

1. An aqueous coating composition for use in cooling coated structures, comprising from about 23% to about 43% of an inorganic, inert and hygroscopic material; from about 5% to about 15% of kaolin clay; from about 1% to about 3% of ammonia; from about 5% to about 9% of styrene; from about 1% to about 5% of an inorganic pigment; from about 2% to about 6% of silicon dioxide; and from about 40% to 60% of water.

2. An aqueous composition according to claim 1, wherein said inorganic, inert and hygroscopic material is calcined diatomite, diatomaceous earth.

3. An aqueous composition according to claim 1, wherein said inorganic, inert and hygroscopic material is silica gel.

4. An aqueous composition according to claim 1, further comprising fungicides; cellulose derivatives; dispersants; emulsifying agents and anti-oxidant materials.

5. A coated structure having an aqueous composition according to claim 1 applied on an outer surface of such structure as a film with a thickness of about 4 mils to about 6 mils.

6. A method for decreasing the inner temperature of a structure exposed to solar radiation, comprising applying an aqueous coating composition according to claim 1 on at least a portion of the exterior surface of at least one of the roofs and walls of such structure as a thin layer having a thickness of about 4 mils to about 6 mils.

7. A method according to claim 6, wherein said inorganic, inert and hygroscopic material is calcined diatomite, diatomaceous earth.

8. A method according to claim 6, wherein said inorganic, inert and hygroscopic material is silica gel.

9. A method according to claim 6, where said hygroscopic material of said coating absorbs water from ambient air and allows evaporation of said water thereby dissipating heat from said roofs or walls.

10. A method according to any of claims 6 to 9, where said coating is manufactured in the form of a paint applicable to at least a portion of at least one of the roofs and walls of a structure chosen from the group consisting of buildings, housings, and other shelters, including offices, silos, warehouses, industrial facilities, ducts, tanks, cold rooms, air cooling equipment, concrete and metallic surfaces.

* * * * *